(12) United States Patent
Lee

(10) Patent No.: US 10,958,931 B2
(45) Date of Patent: Mar. 23, 2021

(54) INTER PREDICTION METHOD AND APPARATUS IN VIDEO CODING SYSTEM

(71) Applicant: LG Electronics Inc., Seoul (KR)

(72) Inventor: Jaeho Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 52 days.

(21) Appl. No.: 16/301,082

(22) PCT Filed: May 11, 2016

(86) PCT No.: PCT/KR2016/004922
§ 371 (c)(1),
(2) Date: Nov. 13, 2018

(87) PCT Pub. No.: WO2017/195914
PCT Pub. Date: Nov. 16, 2017

(65) Prior Publication Data
US 2019/0191178 A1 Jun. 20, 2019

(51) Int. Cl.
H04N 19/52 (2014.01)
H04N 19/11 (2014.01)
(Continued)

(52) U.S. Cl.
CPC ............. *H04N 19/52* (2014.11); *H04N 19/11* (2014.11); *H04N 19/176* (2014.11);
(Continued)

(58) Field of Classification Search
CPC .... H04N 19/11; H04N 19/176; H04N 19/513; H04N 19/52; H04N 19/573; H04N 19/577
See application file for complete search history.

(56) References Cited

U.S. PATENT DOCUMENTS 5,734,737 A * 3/1998 Chang ................... H04N 19/53
375/240.16
2013/0077689 A1* 3/2013 Lim ..................... H04N 19/577
375/240.15
(Continued)

FOREIGN PATENT DOCUMENTS

KR 20110048252 5/2011
KR 20110065503 6/2011
(Continued)

*Primary Examiner* — Joon Kwon
(74) *Attorney, Agent, or Firm* — Fish & Richardson P.C.

(57) ABSTRACT

According to the present invention, a video decoding method comprises the steps of: deriving two motion vectors (MVs) for a current block; determining a super sample from among samples in the current block; deriving a refined motion vector and a first refined prediction sample for the super sample on the basis of the two MVs; deriving a second refined prediction sample for a nonsuper sample on the basis of the refined motion vector, wherein the non-super sample is a sample that is not the super sample from among the samples; and generating reconstructed samples on the basis of the first refined prediction sample and the second refined prediction sample. According to the present invention, a more accurate refined motion vector in a sample unit of a current block can be derived, and inter prediction efficiency can be significantly improved.

11 Claims, 10 Drawing Sheets

(51) Int. Cl.
*H04N 19/573* (2014.01)
*H04N 19/176* (2014.01)
*H04N 19/513* (2014.01)
*H04N 19/577* (2014.01)

(52) U.S. Cl.
CPC ......... *H04N 19/513* (2014.11); *H04N 19/573* (2014.11); *H04N 19/577* (2014.11)

(56) References Cited

U.S. PATENT DOCUMENTS

2013/0083851 A1* 4/2013 Alshin ................ H04N 19/577
375/240.14
2017/0188041 A1* 6/2017 Li ........................ H04N 19/182

FOREIGN PATENT DOCUMENTS

| KR | 20150083826 | 7/2015 |
| KR | 101566557 | 11/2015 |
| KR | 20160046319 | 4/2016 |

* cited by examiner (a)

(b)

INTER PREDICTION METHOD AND APPARATUS IN VIDEO CODING SYSTEM

CROSS-REFERENCE TO RELATED APPLICATIONS

This application is a National Stage application under 35 U.S.C. § 371 of International Application No. PCT/KR2016/004922, filed on May 11, 2016. The disclosure of the prior application is incorporated by reference in its entirety.

BACKGROUND OF THE INVENTION

Field of the Invention

The present invention relates to a technology regarding video coding and, more particularly, to an inter-prediction method and apparatus in a video coding system.

Related Art

Demand for high-resolution, high-quality images such as HD (High Definition) images and UHD (Ultra High Definition) images has been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY OF THE INVENTION

The present invention provides a method and apparatus for improving inter-prediction efficiency.

The present invention also provides a bi-directional prediction method and apparatus.

The present invention also provides a method and apparatus for deriving the best motion vector by refining a motion vector.

The present invention also provides a method and apparatus for deriving refine motion vectors in a sub-block unit.

In an aspect, there is provided a video decoding method performed by a decoding apparatus. The decoding method includes deriving two motion vectors (MVs) for a current block, determining a super sample among samples within the current block, deriving a refine motion vector for the super sample and a first refine prediction sample based on the two MVs, deriving a second refine prediction sample for a non-super sample based on the refine motion vector, wherein the non-super sample is a sample other than the super sample among the samples, and generating reconstruction samples based on the first refine prediction sample and the second refine prediction sample.

In another aspect, there is provided a video decoding apparatus. The decoding apparatus includes a predictor deriving two motion vectors (MVs) for a current block, determining a super sample among samples within the current block, deriving a refine motion vector for the super sample and a first refine prediction sample based on the two MVs, and deriving a second refine prediction sample for a non-super sample based on the refine motion vector and an adder generating reconstruction samples based on the first refine prediction sample and the second refine prediction sample.

In yet another aspect, there is provided a video encoding method performed by an encoding apparatus. The encoding method includes deriving two motion vectors (MVs) for a current block, determining a super sample among samples within the current block, deriving a refine motion vector for the super sample and a first refine prediction sample based on the two MVs, deriving a second refine prediction sample for a non-super sample based on the refine motion vector, wherein the non-super sample is a sample other than the super sample among the samples, and encoding and outputting information on prediction of the current block and information on a residual sample.

In yet another aspect, there is provided a video encoding apparatus. The encoding apparatus includes a predictor deriving two motion vectors (MVs) for a current block, determining a super sample among samples within the current block, deriving a refine motion vector for the super sample and a first refine prediction sample based on the two MVs, and deriving a second refine prediction sample for a non-super sample based on the refine motion vector, and an entropy encoder encoding and outputting information on prediction of the current block and information on a residual sample.

In accordance with the present invention, a more accurate refine motion vector of a current block of a sample unit can be derived, and inter-prediction efficiency can be significantly improved.

In accordance with the present invention, the best prediction samples can be obtained based on a refine motion vector. Accordingly, the amount of data for a residual signal for a current block can be obviated or reduced and overall coding efficiency can be improved.

DESCRIPTION OF EXEMPLARY EMBODIMENTS

Figure 1:
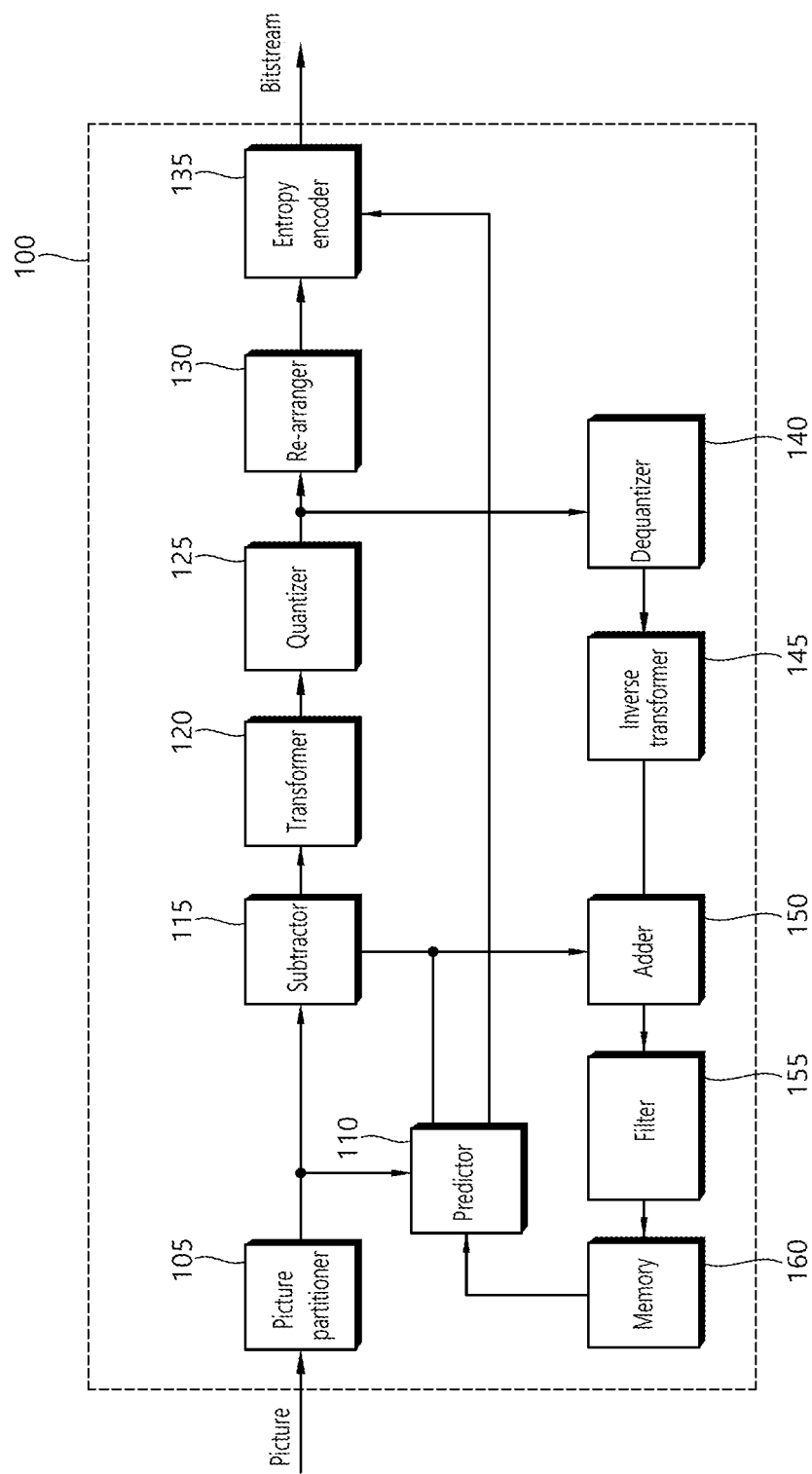
FIG. 1 is a schematic diagram illustrating a configuration of a video encoding device to which the present invention is applicable.

The present invention may be modified in various forms, and specific embodiments thereof will be described and illustrated in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the invention without departing from the concept of the invention.

Hereinafter, embodiments of the present invention will be described in detail with reference to the accompanying drawings. In addition, like reference numerals are used to indicate like elements throughout the drawings, and the same descriptions on the like elements will be omitted.

In the present specification, generally a picture means a unit representing an image at a specific time, a slice is a unit constituting a part of the picture. One picture may be composed of plural slices, and the terms of a picture and a slice may be mixed with each other as occasion demands.

A pixel or a pel may mean a minimum unit constituting one picture (or image). Further, a 'sample' may be used as a term corresponding to a pixel. The sample may generally represent a pixel or a value of a pixel, may represent only a pixel (a pixel value) of a luma component, and may represent only a pixel (a pixel value) of a chroma component.

A unit indicates a basic unit of image processing. The unit may include at least one of a specific area and information related to the area. Optionally, the unit may be mixed with terms such as a block, an area, or the like. In a typical case, an M×N block may represent a set of samples or transform coefficients arranged in M columns and N rows.

FIG. 1 briefly illustrates a structure of a video encoding device to which the present invention is applicable.

Referring to FIG. 1, a video encoding device 100 includes a picture partitioner 105, a predictor 110, a subtractor 115, a transformer 120, a quantizer 125, a re-arranger 130, an entropy encoder 135, a dequantizer 140, an inverse transformer 145, an adder 150, a filter 255, and a memory 160.

The picture partitioner 105 may split an input picture into at least one processing unit. Here, a processing unit may be a coding unit (CU), a prediction unit (PU) or a transform unit (TU). The coding unit is a unit block of coding, and a largest coding unit (LCU) may be split into coding units of deeper depth according to a quad-tree structure. In this case, the largest coding unit may be used as a final coding unit or a coding unit may be recursively split into coding units of deeper depth as necessary and a coding unit having an optimal size may be used as a final coding unit based on coding efficiency according to video characteristics. When a smallest coding unit (SCU) is set, a coding unit cannot be split into a coding unit smaller than the smallest coding unit. Here, the final coding unit refers to a coding unit partitioned or split into a predictor or a transformer. A prediction unit is a block partitioned from a coding unit block and may be a unit block of sample prediction. Here, the prediction unit may be divided into sub blocks. A transform block can be split from a coding unit block according to the quad-tree structure and may be a unit block that derives a transform coefficient and/or a unit block that derives a residual signal from a transform coefficient.

Hereinafter, the coding unit may be called a coding block (CB), the prediction unit may be called a prediction block (PB), and the transform unit may be called a transform block (TB).

The prediction block or the prediction unit may mean a specific area having a block shape in a picture, and may include an array of a prediction sample. Further, the transform block or the transform unit may mean a specific area having a block shape in a picture, and may include a transform coefficient or an array of a residual sample.

The predictor 110 may perform prediction on a processing target block (hereinafter, a current block), and may generate a prediction block including prediction samples for the current block. A unit of prediction performed in the predictor 110 may be a coding block, or may be a transform block, or may be a prediction block.

The predictor 110 may determine whether intra-prediction is applied or inter-prediction is applied to the current block. For example, the predictor 110 may determine whether the intra-prediction or the inter-prediction is applied in unit of CU.

In case of the intra-prediction, the predictor 110 may derive a prediction sample for the current block based on a reference sample outside the current block in a picture to which the current block belongs (hereinafter, a current picture). In this case, the predictor 110 may derive the prediction sample based on an average or interpolation of neighboring reference samples of the current block (case (i)), or may derive the prediction sample based on a reference sample existing in a specific (prediction) direction as to a prediction sample among the neighboring reference samples of the current block (case (ii)). The case (i) may be called a non-directional mode or a non-angular mode, and the case (ii) may be called a directional mode or an angular mode. In the intra-prediction, prediction modes may include as an example 33 directional modes and at least two non-directional modes. The non-directional modes may include DC mode and planar mode. The predictor 110 may determine the prediction mode to be applied to the current block by using the prediction mode applied to the neighboring block.

In case of the inter-prediction, the predictor 110 may derive the prediction sample for the current block based on a sample specified by a motion vector on a reference picture. The predictor 110 may derive the prediction sample for the current block by applying any one of a skip mode, a merge mode, and a motion vector prediction (MVP) mode. In case of the skip mode and the merge mode, the predictor 110 may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector predictor and thus is used as a motion vector predictor of the current block to derive a motion vector of the current block.

In case of the inter-prediction, the neighboring block may include a spatial neighboring block existing in the current picture and a temporal neighboring block existing in the reference picture. The reference picture including the temporal neighboring block may also be called a collocated picture (colPic). Motion information may include the motion vector and a reference picture index. Information such as prediction mode information and motion information may be (entropy) encoded, and then output as a form of a bitstream.

When motion information of a temporal neighboring block is used in the skip mode and the merge mode, a highest picture in a reference picture list may be used as a reference picture. Reference pictures included in the reference picture list may be aligned based on a picture order count (POC) difference between a current picture and a corresponding reference picture. A POC corresponds to a display order and can be discriminated from a coding order.

The subtractor 115 generates a residual sample which is a difference between an original sample and a prediction sample. If the skip mode is applied, the residual sample may not be generated as described above.

The transformer 120 transforms residual samples in units of a transform block to generate a transform coefficient. The transformer 120 may perform transformation based on the size of a corresponding transform block and a prediction mode applied to a coding block or prediction block spatially overlapping with the transform block. For example, residual samples can be transformed using discrete sine transform (DST) if intra-prediction is applied to the coding block or the prediction block overlapping with the transform block and the transform block is a 4×4 residual array and is transformed using discrete cosine transform (DCT) in other cases.

The quantizer 125 may quantize the transform coefficients to generate a quantized transform coefficient.

The re-arranger 130 rearranges quantized transform coefficients. The re-arranger 130 may rearrange the quantized transform coefficients in the form of a block into a one-dimensional vector through a coefficient scanning method. Although the re-arranger 130 is described as a separate component, the re-arranger 130 may be a part of the quantizer 125.

The entropy encoder 135 may perform entropy-encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder 135 may perform encoding together or separately on information (e.g., a syntax element value or the like) required for video reconstruction in addition to the quantized transform coefficients. The entropy-encoded information may be transmitted or stored in unit of a network abstraction layer (NAL) in a bitstream form.

The dequantizer 140 dequantizes values (transform coefficients) quantized by the quantizer 125 and the inverse transformer 145 inversely transforms values dequantized by the dequantizer 135 to generate a residual sample.

The adder 150 adds a residual sample to a prediction sample to reconstruct a picture. The residual sample may be added to the prediction sample in units of a block to generate a reconstructed block. Although the adder 150 is described as a separate component, the adder 150 may be a part of the predictor 110.

The filter 155 may apply deblocking filtering and/or a sample adaptive offset to the reconstructed picture. Artifacts at a block boundary in the reconstructed picture or distortion in quantization can be corrected through deblocking filtering and/or sample adaptive offset. Sample adaptive offset may be applied in units of a sample after deblocking filtering is completed. The filter 155 may apply an adaptive loop filter (ALF) to the reconstructed picture. The ALF may be applied to the reconstructed picture to which deblocking filtering and/or sample adaptive offset has been applied.

The memory 160 may store a reconstructed picture or information necessary for encoding/decoding. Here, the reconstructed picture may be the reconstructed picture filtered by the filter 155. The stored reconstructed picture may be used as a reference picture for (inter) prediction of other pictures. For example, the memory 160 may store (reference) pictures used for inter-prediction. Here, pictures used for inter-prediction may be designated according to a reference picture set or a reference picture list.

Figure 2:
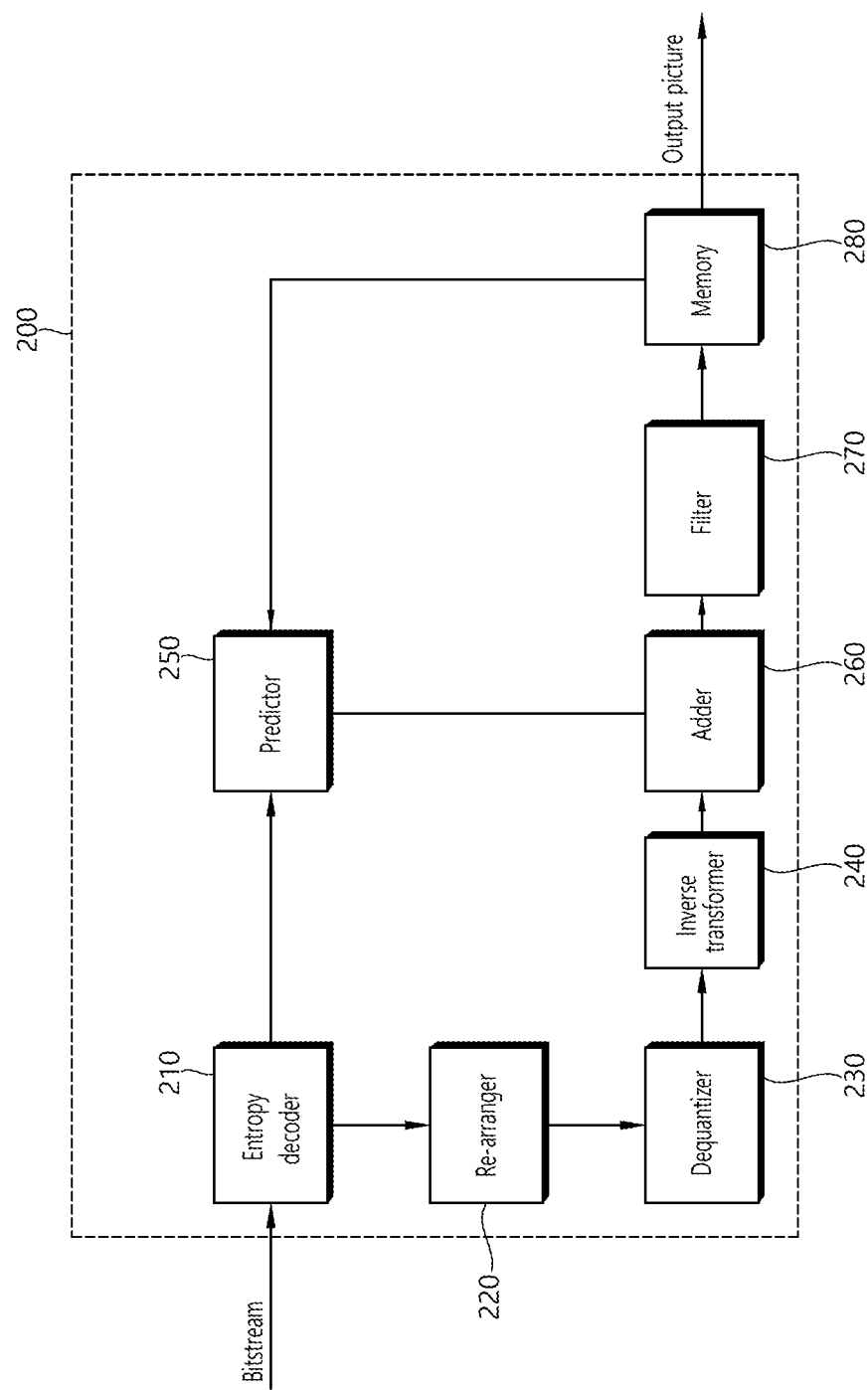
FIG. 2 is a schematic diagram illustrating a configuration of a video decoding device to which the present invention is applicable.

FIG. 2 briefly illustrates a structure of a video decoding device to which the present invention is applicable.

Referring to FIG. 2, a video decoding device 200 includes an entropy decoder 210, a re-arranger 220, a dequantizer 230, an inverse transformer 240, a predictor 250, an adder 260, a filter 270, and a memory 280.

When a bitstream including video information is input, the video decoding device 200 may reconstruct a video in association with a process by which video information is processed in the video encoding device.

For example, the video decoding device 200 may perform video decoding by using a processing unit applied in the video encoding device. Therefore, the processing unit block of video decoding may be a coding unit block, a prediction unit block, or a transform unit block. As a unit block of decoding, the coding unit block may be split according to a quad tree structure from a largest coding unit block. As a block partitioned from the coding unit block, the prediction unit block may be a unit block of sample prediction. In this case, the prediction unit block may be divided into sub blocks. As a coding unit block, the transform unit block may be split according to the quad tree structure, and may be a unit block for deriving a transform coefficient or a unit block for deriving a residual signal from the transform coefficient.

The entropy decoder 210 may parse the bitstream to output information required for video reconstruction or picture reconstruction. For example, the entropy decoder 210 may decode information in the bitstream based on a coding method such as exponential Golomb encoding, CAVLC, CABAC, or the like, and may output a value of a syntax element required for video reconstruction and a quantized value of a transform coefficient regarding a residual.

More specifically, a CABAC entropy decoding method can receive a bin corresponding to each syntax element in a bitstream, determine a context model using decoding target syntax element information and decoding information of neighboring and decoding target blocks or information of amabol/bin decoded in a previous step, predict bin generation probability according to the determined context model and perform arithmetic decoding of the bin to generate a symbol corresponding to each syntax element value. Here, the CABAC entropy decoding method can update the context model using information of a symbol/bin decoded for a context model of the next symbol/bin after determination of the context model.

Information about prediction among information decoded in the entropy decoder 210 may be provided to the predictor 250 and residual values, that is, quantized transform coefficients, on which entropy decoding has been performed by the entropy decoder 210 may be input to the re-arranger 220.

The re-arranger 220 may rearrange the quantized transform coefficients into a two-dimensional block form. The re-arranger 220 may perform rearrangement corresponding to coefficient scanning performed by the encoding device. Although the re-arranger 220 is described as a separate component, the re-arranger 220 may be a part of the quantizer 230.

The dequantizer 230 may de-quantize the quantized transform coefficients based on a (de)quantization parameter to output a transform coefficient. In this case, information for deriving a quantization parameter may be signaled from the encoding device.

The inverse transformer 240 may inverse-transform the transform coefficients to derive residual samples.

The predictor 250 may perform prediction on a current block, and may generate a prediction block including prediction samples for the current block. A unit of prediction performed in the predictor 250 may be a coding block or may be a transform block or may be a prediction block.

The predictor 250 may determine whether to apply intra-prediction or inter-prediction based on information on a prediction. In this case, a unit for determining which one will be used between the intra-prediction and the inter-prediction may be different from a unit for generating a prediction sample. In addition, a unit for generating the prediction sample may also be different in the inter-prediction and the intra-prediction. For example, which one will be applied between the inter-prediction and the intra-prediction may be determined in unit of CU. Further, for example, in the inter-prediction, the prediction sample may be generated by determining the prediction mode in unit of PU, and in the intra-prediction, the prediction sample may be generated in unit of TU by determining the prediction mode in unit of PU.

In case of the intra-prediction, the predictor 250 may derive a prediction sample for a current block based on a neighboring reference sample in a current picture. The predictor 250 may derive the prediction sample for the current block by applying a directional mode or a non-directional mode based on the neighboring reference sample of the current block. In this case, a prediction mode to be applied to the current block may be determined by using an intra-prediction mode of a neighboring block.

In the case of inter-prediction, the predictor 250 may derive a prediction sample for a current block based on a sample specified in a reference picture according to a motion vector. The predictor 250 may derive the prediction sample for the current block using one of the skip mode, the merge mode and the MVP mode. Here, motion information required for inter-prediction of the current block provided by the video encoding device, for example, a motion vector and information about a reference picture index may be acquired or derived based on the information about prediction.

In the skip mode and the merge mode, motion information of a neighboring block may be used as motion information of the current block. Here, the neighboring block may include a spatial neighboring block and a temporal neighboring block.

The predictor 250 may construct a merge candidate list using motion information of available neighboring blocks and use information indicated by a merge index on the merge candidate list as a motion vector of the current block. The merge index may be signaled by the encoding device. Motion information may include a motion vector and a reference picture. When motion information of a temporal neighboring block is used in the skip mode and the merge mode, a highest picture in a reference picture list may be used as a reference picture.

In the case of the skip mode, a difference (residual) between a prediction sample and an original sample is not transmitted, distinguished from the merge mode.

In the case of the MVP mode, the motion vector of the current block may be derived using a motion vector of a neighboring block as a motion vector predictor. Here, the neighboring block may include a spatial neighboring block and a temporal neighboring block.

When the merge mode is applied, for example, a merge candidate list can be generated using a motion vector of a reconstructed spatial neighboring block and/or a motion vector corresponding to a Col block which is a temporal neighboring block. A motion vector of a candidate block selected from the merge candidate list is used as the motion vector of the current block in the merge mode. The aforementioned information about prediction may include a merge index indicating a candidate block having the best motion vector selected from candidate blocks included in the merge candidate list. Here, the predictor 250 may derive the motion vector of the current block using the merge index.

When the MVP (Motion Vector Prediction) mode is applied as another example, a motion vector predictor candidate list may be generated using a motion vector of a reconstructed spatial neighboring block and/or a motion vector corresponding to a Col block which is a temporal neighboring block. That is, the motion vector of the reconstructed spatial neighboring block and/or the motion vector corresponding to the Col block which is the temporal neighboring block may be used as motion vector candidates. The aforementioned information about prediction may include a prediction motion vector index indicating the best motion vector selected from motion vector candidates included in the list. Here, the predictor 250 may select a prediction motion vector of the current block from the motion vector candidates included in the motion vector candidate list using the motion vector index. The predictor of the encoding device may obtain a motion vector difference (MVD) between the motion vector of the current block and a motion vector predictor, encode the MVD and output the encoded MVD in the form of a bitstream. That is, the MVD can be obtained by subtracting the motion vector predictor from the motion vector of the current block. Here, the predictor 250 may acquire a motion vector included in the information about prediction and derive the motion vector of the current block by adding the motion vector difference to the motion vector predictor. In addition, the predictor may obtain or derive a reference picture index indicating a reference picture from the aforementioned information about prediction.

The adder 260 can add a residual sample to a prediction sample to reconstruct a current block or a current picture. The adder 260 may reconstruct the current picture by adding the residual sample to the prediction sample in units of a block. When the skip mode is applied, a residual is not transmitted and thus the prediction sample may become a reconstructed sample. Although the adder 260 is described as a separate component, the adder 260 may be a part of the predictor 250.

The filter 270 may apply deblocking filtering, sample adaptive offset and/or ALF to the reconstructed picture. Here, sample adaptive offset may be applied in units of a sample after deblocking filtering. The ALF may be applied after deblocking filtering and/or application of sample adaptive offset.

The memory 280 may store a reconstructed picture or information necessary for decoding. Here, the reconstructed picture may be the reconstructed picture filtered by the filter 270. For example, the memory 280 may store pictures used for inter-prediction. Here, the pictures used for inter-prediction may be designated according to a reference picture set or a reference picture list. A reconstructed picture may be used as a reference picture for other pictures. The memory 280 may output reconstructed pictures in an output order.

One or two reference picture lists may be used for inter-prediction for a current block. That is, for the prediction of a current block, a reference picture list 0 or a reference picture list 1 may be used or both the reference picture lists 0 and 1 may be configured. For example, if the slice type of a slice including a current block is B (B slice), at least one of the two reference picture lists may be used. If the slice type of a slice including a current block is P (P slice), only the reference picture list 0 may be used. The reference picture list 0 may be called L0, and the reference picture list 1 may be called L1. In performing the prediction of the current block, when inter-prediction is performed based on the L0, it may be called L0 prediction. When inter-prediction is performed based on the L1, it may be called L1 prediction. When inter-prediction is performed based on both the L0 and the L1, it may be called bi-prediction. In this case, separate motion vectors may be used for the L0 prediction and the L1 prediction. For example, a motion vector MVL0 for the L0 prediction for the current block and a motion vector MVL1 for the L1 prediction for the current block may be separately derived. In this case, for example, when the MVL0 indicates a first reference region within a first reference picture within the L0 and the MVL1 indicates a second reference region within a second reference picture within the L1, a prediction sample of the current block may be derived through the weighted sum of a first predictor obtained from the reconstruction sample of the first reference region and a second predictor obtained from the reconstruction sample of the second reference region. In this case, the weighted sum may be performed based on a first time interval between the current picture and the first reference picture and a second time interval between the current picture and the second reference picture. In this case, the time interval may indicate a picture order count (POC) difference. That is, a difference between a POC value of the current picture and a POC value of the first reference picture may be the first time interval. A difference between the POC value of the current picture and a POC value of the second reference picture may be the second time interval.

Meanwhile, in accordance with the present invention, if the aforementioned bi-prediction is applied, a refined motion vector of a sample unit may be obtained based on the MVL0 and MVL1 for the current block, the first predictor and the second predictor, and a prediction sample of further improved prediction performance may be derived. This may be called refine prediction. The prediction sample may be called a refined prediction sample differently from the existing prediction sample. The refined motion vector and the refined prediction sample may be derived through the following method, for example.

Assuming that there is no change in the sample (pixel) value of an object in brightness constancy constraint (BCC), that is, in continuous frames, a motion of the object according to an optical flow (OF) may be represented into the following equation.

$$I(x,y,t) = I(x+\Delta x, y+\Delta y, t+\Delta t) \quad \text{[Equation 1]}$$

In this case, I(x,y,t) indicates a sample value in an (x,y) sample position and t time, and Δ indicates a change. Assuming a small motion, the right term of Equation 1 may be represented in the linear expression of a Taylor series as follows.

$$I(x, y, t) = I(x, y, t) + \frac{\partial I}{\partial x}\Delta x + \frac{\partial I}{\partial y}\Delta y + \frac{\partial I}{\partial t}\Delta t \quad \text{[Equation 2]}$$

In this case, when Equation 2 is divided by Δt, it may be represented as follows.

$$0 = \frac{dI}{dt} = \frac{\partial I}{\partial x}V_x + \frac{\partial I}{\partial y}V_y + \frac{\partial I}{\partial t} \quad \text{[Equation 3]}$$

In this case, $V_x = \Delta x/\Delta t$, and $V_y$ is $\Delta y/\Delta t$.

The above equation includes two unknown quantities (motion and a spatial derivative of a signal). Accordingly, a spatial derivative is necessary for motion analysis.

In accordance with the present invention, a refined motion vector and a reference sample value may be obtained in a sample (pixel) unit without the transmission of an additional motion vector using the optical flow (OF) characteristic. For example, assuming that an object additionally moves at a constant speed for a short time in the BCC, MVL0 and MVL1 may be represented as symmetrical values.

Figure 3:
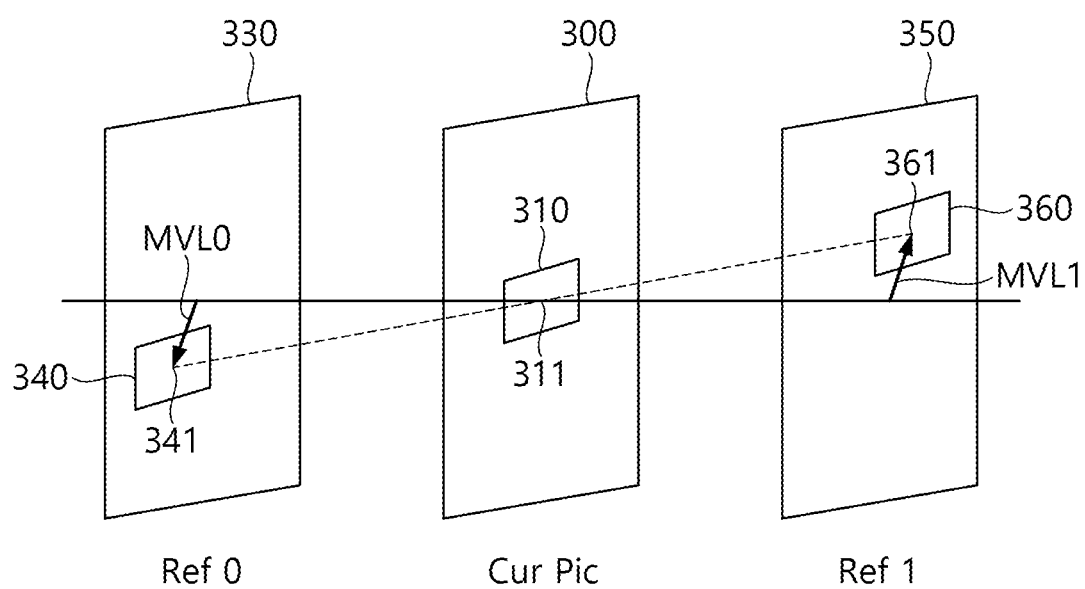
FIG. 3 illustrates bi-prediction motion vectors when a BCC and an object are assumed to move at a constant speed for a short time.

FIG. 3 illustrates bi-prediction motion vectors when a BCC and an object are assumed to move at a constant speed for a short time.

Referring to FIG. 3, assuming that BBC and an object are assumed to move at a constant speed for a short time, in bi-prediction for a current block 310 within a current picture 300, MVL0 indicates a motion vector between the current block 310 and a first reference block 340 within a first reference picture (Ref0) 330. MVL1 indicates a motion vector between the current block 310 and a second reference block 360 within a second reference picture (Ref1) 350. In this case, the representative position of each of the blocks 310, 330 and 360 may be the top-left sample position of each block. In this case, the MVL0 and the MVL1 may be represented as symmetrical values.

In FIG. 3, a first reference sample value at a position according to the MVL0 and a second reference sample value at a position according to the MVL1 may be derived based on a given sample 311 within the current block 310. In this case, the first reference sample value may be called a first predictor or an L0 predictor, and the second reference sample value may be called a second predictor or an L1 predictor. A difference between the first reference sample value and the second reference sample value may be represented in the following equation.

$$\Delta[i,j] = I^0[i+v_x, j+v_y] - I^1[i-v_x, j-v_y] \quad \text{[Equation 4]}$$

In this case, $I^0[i+v_x, j+v_y]$ indicates a sample value (i.e., the first reference sample value) at the sample position 341 of the first reference picture (Ref0) 330. $I^1[i-v_x, j-v_y]$ indicates a sample value (i.e., the second reference sample value) at the sample position 361 of the second reference picture (Ref1) 350. The sample values may be represented by the following equation.

$$I^0[i+v_x, j+v_y] = I^0[i, j] + \frac{\partial I^0[i, j]}{\partial x}v_x + \frac{\partial I^0[i, j]}{\partial y}v_y \quad \text{[Equation 5]}$$

$$I^1[i-v_x, j-v_y] = I^1[i, j] - \frac{\partial I^1[i, j]}{\partial x}v_x - \frac{\partial I^1[i, j]}{\partial y}v_y$$

Furthermore, Equation 6 may be obtained by substituting Equation 4 into Equation 5.

$$\Delta[i,j] = I^{(0)}[i,j] - I^{(1)}[i,j] + v_x[i,j](I_x^{(0)}[i,j] + I_x^{(1)}[i,j]) + v_y[i,j]$$
$$(I_y^{(0)}[i,j] + I_y^{(1)}[i,j])$$ [Equation 6]

In this case, $I^{(0)}[i,j]$ indicates an L0 reference sample value, $I^{(1)}[i,j]$ indicates an L1 reference sample value, and $I_x^{(k)}[i,j]$ and $I_y^{(k)}[i,j]$ indicate x axis and y axis changes, that is, gradients, respective. Specifically, $I_x^{(0)}[i,j]$ and $I_y^{(0)}[i,j]$ indicate x axis and y axis partial differentiation values, respectively, at the [i,j] position of the first reference picture (Ref0) 330 within L0. $I_x^{(1)}[i,j]$ and $I_y^{(1)}[i,j]$ indicate x axis and y axis partial differentiation values, respectively, at the [i,j] position of the second reference picture (Ref1) 350 within L1.

Motion vectors $v_x[i,j]$ and $v_y[i,j]$ of a sample unit that enable $\Delta^2[i,j]$ to have a minimum value may be calculated using Equation 6. For example, it may be assumed that samples in a specific region around [i,j], a window $\Omega$ have a locally steady motion. In this case, the window $\Omega$ may include $(2M+1) \times (2M+1)$ samples. In this case, a sample position within the window $\Omega$ may be indicated as [i',j']. In this case, in [i',j'], $i-M \leq i' \leq i+M$ and $j-M \leq j' \leq j+M$ are satisfied. A motion vector that minimizes $\Sigma_\Omega \Delta^2[i',j']$ may be calculated. In this case, the may be represented like the following equation.

$$\Delta^2[i',j'] = (Vx\Sigma_\Omega Gx + Vy\Sigma_\Omega Gy + \Sigma_\Omega \delta P)^2$$ [Equation 7]

In this case, $Gx = (I_x^{(0)}[i',j'] + I_x^{(1)}[i',j'])$, $Gy = (I_y^{(0)}[i',j'] + I_y^{(1)}[i',j'])$, and $\delta P = (P^{(0)}[i',j'] - P^{(1)}[i',j'])$. In this case, $P^{(0)}[i',j']$ and $P^{(1)}[i',j']$ indicate an L0 predictor and an L1 predictor, respectively. The $P^{(0)}[i',j']$ and the $P^{(1)}[i',j']$ correspond to $I^0[i',j']$ and $I^1[i',j']$, respectively.

Equation 7 is arranged as follows by partial differentiation with $V_x$ and $V_y$ respectively.

$$Vx\Sigma_\Omega G^2x + Vy\Sigma_\Omega GxGy + \Sigma_\Omega Gx\delta P = 0$$

$$Vx\Sigma_\Omega GxGy + Vy\Sigma_\Omega G^2y + \Sigma_\Omega Gy\delta P = 0$$ [Equation 8]

In this case, assuming that $s1 = \Sigma_\Omega G^2x$, $s2 = s4 = \Sigma_\Omega GxGy$, $s3 = -\Sigma_\Omega Gx\delta P$, $s5 = \Sigma_\Omega G^2y$, $s6 = -\Sigma_\Omega Gy\delta P$, Vx and Vy may be arranged as follows.

$$Vx = \frac{s3s5 - s2s6}{s1s5 - s2s4},$$ [Equation 9]

$$Vy = \frac{s1s6 - s3s4}{s1s5 - s2s4}$$

Accordingly, a refined predictor (prediction sample value) for a current sample at the [i,j] position may be calculated as follows using the Vx and the Vy.

$$P[i,j] = ((P^{(0)}[i,j] + P^{(1)}[i,j]) + Vx[i,j](I_x^{(0)}[i,j] - I_x^{(1)}[i,j]) +$$
$$Vy[i,j](I_y^{(0)}[i,j] - I_y^{(1)}[i,j])) >> 1$$ [Equation 10]

A refined motion vector of a sample unit and a prediction sample value may be calculated based on the above method. In this case, P[i,j] indicates a refined predictor for a current sample at the [i,j] position, and Vx[i,j] and Vy[i,j] indicate the x component and y component of the refined motion vector for the current sample.

The derivation of a refine prediction sample according to the present invention may be performed based on the following procedure, for example.

Figure 4:
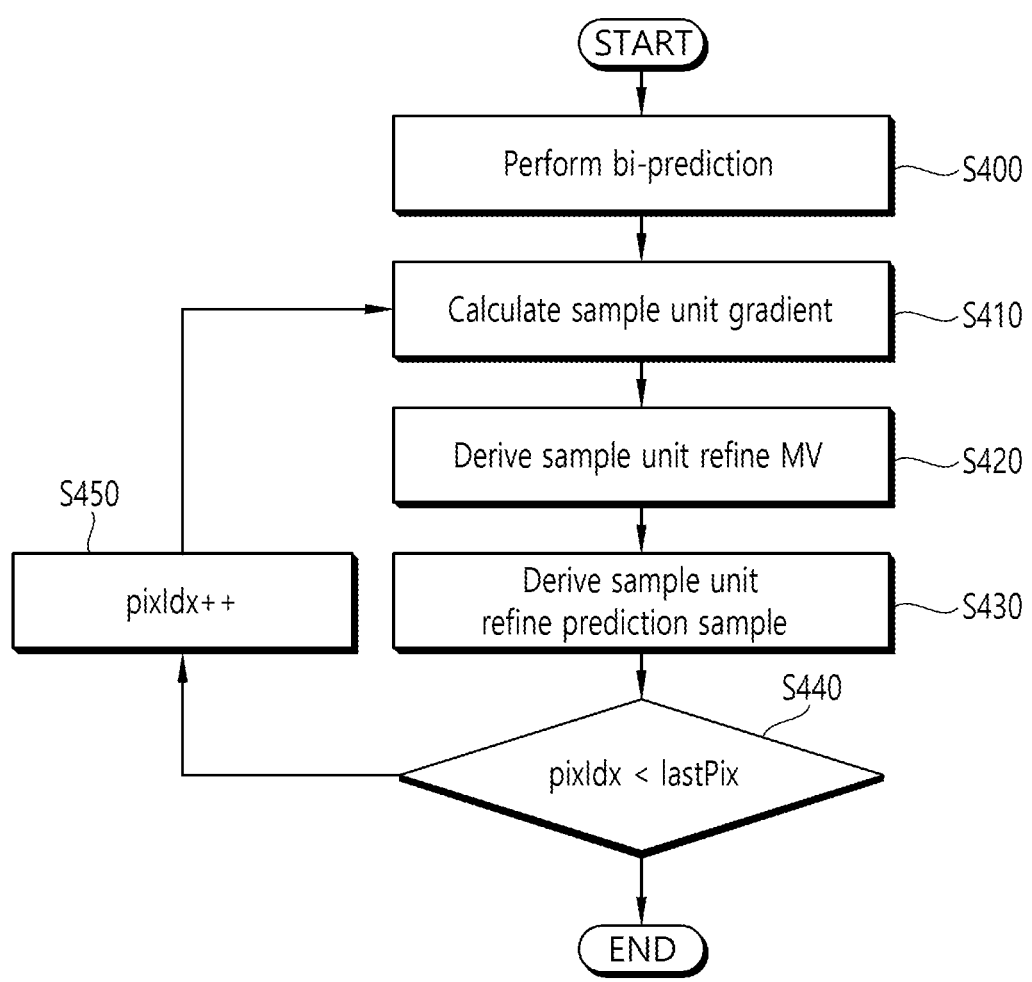
FIG. 4 schematically shows a procedure of deriving a refine prediction sample according to an example of the present invention.

FIG. 4 schematically shows a procedure of deriving a refine prediction sample according to an example of the present invention. The procedure of FIG. 4 may be performed by a coding apparatus. The coding apparatus may include an encoding apparatus or a decoding apparatus.

Referring to FIG. 4, the coding apparatus performs a bi-prediction procedure (S400). In this case, the bi-prediction procedure includes obtaining an MVL0 and an MVL1, and deriving a first reference region on a first reference picture included in L0 based on the MVL0 and deriving a second reference region on a second reference picture included in L1 based on the MVL1. When viewed based on a current sample, the first reference region includes an L0 predictor for the current sample, and the second reference region includes an L1 predictor for the current sample. In this case, the L0 predictor may correspond to an L0 reference sample value, and the L1 predictor may correspond to an L1 reference sample value.

In this case, the MVL0 and MVL1 may be obtained based on spatial/temporal neighbor blocks, respectively, as described above. For example, if a skip mode or a merge mode is applied, the motion vector and reference picture index of a neighbor block may be used as the motion vector MVL0 or MVL1 and reference picture index (reference picture index for L0 or L1) of a current block. For another example, if an MVP mode is applied, the motion vector predictor of a current block may be derived based on the motion vector of a neighbor block, and the motion vector MVL0 or MVL1 of the current block may be derived by adding an MVD to the motion vector predictor. If the MVP mode is applied, a reference picture index (reference picture index for L0 or L1) may be separately signaled. In this case, the coding apparatus may encode/decode the reference picture index.

The coding apparatus calculates a sample unit gradient for a current block (S410). The coding apparatus may calculate the sample unit gradient based on the MVL0, the MVL1, the first reference region and the second reference region. The gradient may correspond to $I_x^{(k)}[i,j]$ and $I_y^{(k)}[i,j]$ of Equation 6.

The $I_x^{(k)}[i,j]$ and $I_y^{(k)}[i,j]$ may be calculated as follows, for example.

$$I_x^{(k)}[i,j] = (P^{(k)}[i+1,j] - P^{(k)}[i-1,j])/2,$$

$$I_y^{(k)}[i,j] = (P^{(k)}[i+1,j] - P^{(k)}[i-1,j])/2, \; k=0,1$$ [Equation 11]

In this case, P indicates a sample value in a corresponding reference region and sample position. For example, $P^{(0)}[i+1,j]$ indicates a sample value at the [i+1,j] sample position of a first reference region within L0, and $P^{(1)}[i+1,j]$ indicates a sample value at the [i+1,j] sample position of a second reference region within L1.

Meanwhile, in order to further improve accuracy and prediction efficiency, a sample value P may be derived based on the following equation by taking into consideration ¼ fractional sample unit accuracy.

$$P^{(k)}[i] = \sum_{n=-M+1}^{M} F_n(\alpha_x^{(k)}) R^{(k)}[i+n]$$ [Equation 12]

In this case, the P is calculated based on the weighted sum of surrounding 2M sample values. The F is a filter function, and a indicates the filter coefficient of the ¼ fractional sample unit. The filter coefficient may be previously determined or may be selected from several filter coefficient sets.

If Equation 12 is used, the gradient may be represented as follows.

$$I_x^{(k)}[i] = \sum_{n=-M+1}^{M} dF_n(\alpha_x^{(k)})R^{(k)}[i+n], k = 0, 1 \quad \text{[Equation 13]}$$

The coding apparatus may calculate the sample unit gradient based on Equation 11 and/or Equation 13.

The coding apparatus derives a sample unit refine motion vector (MV) (S420). The coding apparatus calculates the refine motion vector in which an error (ex. $\Sigma_\Omega \Delta^2[i',j']$) within an M×N region (or window) around the current sample is minimized. In this case, the coding apparatus may calculate the refine motion vector based on Equations 7 to 9.

The coding apparatus derives a sample unit refine prediction sample (S430). The coding apparatus may derive the sample unit refine prediction sample based on the sample unit gradient and the sample unit refine MV. In this case, the coding apparatus may derive the sample unit refine prediction sample based on Equation 10.

The coding apparatus checks whether the index (pixIdx) of the current sample is smaller than a last sample index (lastPix) (S440). If the index of the current sample is smaller than the last sample index, the coding apparatus adds +1 to the index value of the current sample (S450), and repeats the procedures S410 to S430 on a sample having the index of the n+1 value. That is, if the current sample is not the last sample of a current block, the coding apparatus repeats the procedures S410 to S430 on a next sample of the current sample. Accordingly, the coding apparatus can derive a refined prediction sample value for each of samples within the current block.

Meanwhile, the accuracy of a value of the refined prediction sample can be further improved as the motion vectors (MVL0, MVL1) and reference sample values (L0 reference sample and L1 prediction sample) of the current block becomes accurate. However, the motion vectors of the current block are values calculated in a block unit, and thus there is a problem in that the motion vector has relatively lower accuracy than the refined MV calculated in the sample unit.

Accordingly, in accordance with the present invention, the following method may be performed in order to further improve the accuracy of a refine prediction sample.

Figure 5:
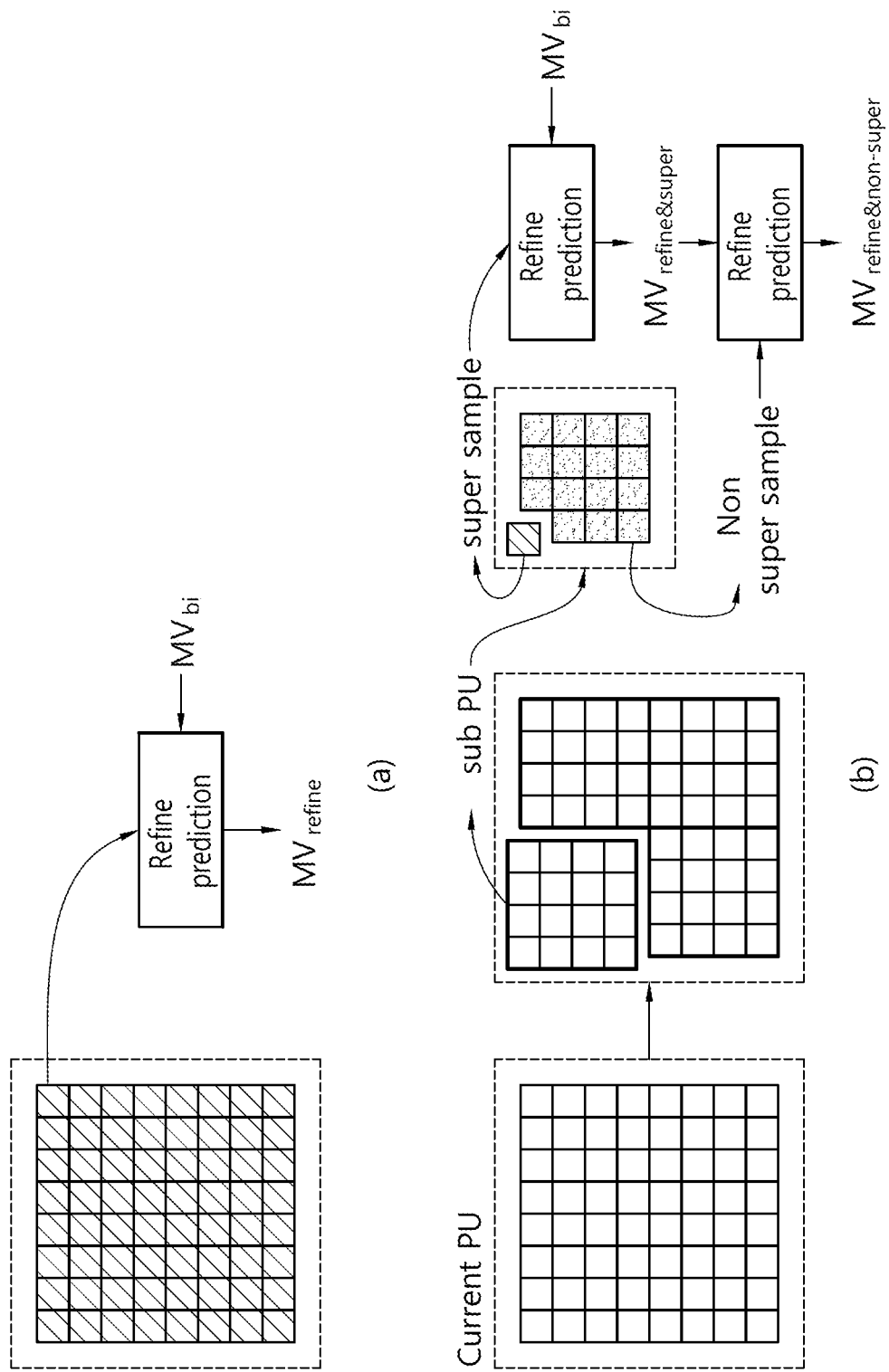
FIG. 5 shows a refine prediction method according to an embodiment of the present invention.

FIG. 5 shows a refine prediction method according to an embodiment of the present invention. FIG. 5 shows a case where a current block is a prediction unit (PU) or a prediction block (PB).

Referring to FIG. 5, (a) is an example in which refine prediction is performed on all samples based on motion vectors MVL0 and MVL1 derived with respect to a current PU as described above in FIG. 4. In this case, prediction efficiency can be further improved compared to the existing bi-prediction, but the motion vector of the current PU having low accuracy is used for all the samples.

In contrast, (b) is an example in which a current PU is partitioned into n sub PUs, super sample and non-super samples are divided from the samples of the sub PUs, and refine MVs derived through the refine prediction of the super samples are used for the refine prediction of the non-super samples. That is, in this case, a refine MV for a super sample and a refine prediction sample may be derived by applying refine prediction to the super sample of the sub PU based on MVL0 and MVL1 derived with respect to the current PU. Thereafter, (refine MVs and) refine prediction samples for the non-super samples may be derived by applying refine prediction to the non-super samples based on the refine MV for the super sample. In this case, the original point symmetrical value of the refine MV for the super sample including a symmetrical refine MV may be further derived and used as an input value. For example, in the refine prediction for the non-super sample, $I^{(0)}[i,j]$ of Equation 6 may be an L0 reference sample value derived using the refine MV (or symmetrical refine MV), and $I^{(1)}[i,j]$ may be an L1 reference sample value derived using the symmetrical refine MV (or the refine MV).

In a PU for refine prediction, the partitioning into the n sub PUs may be performed as follows, for example. In this case, a current block may be a PU or a current block may be one of sub PUs.

For example, the PU may be partitioned into sub PUs of an N P×Q size. In this case, P and Q are positive integers.

Figure 6:
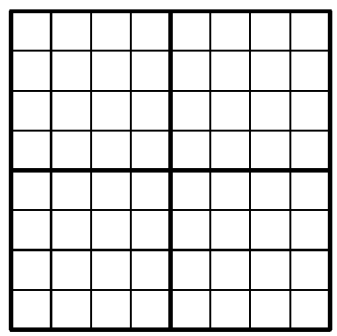
FIG. 6 illustrates a method of deriving a sub PU according to an example of the present invention.
Figure 6:
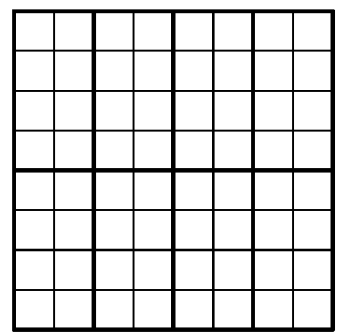

FIG. 6 illustrates a method of deriving a sub PU according to an example of the present invention.

In FIG. 6, (a) is an example in which an 8×8 size PU is partitioned into 4×4 size sub PUs, and (b) is an example in which an 8×8 size PU is partitioned into 4×2 size sub PUs. The size of the sub PUs may be previously determined. Alternatively, regarding the size of the sub PUs, one of previously determined sub PU size candidates may be selected, and the index of the selected candidate may be signaled. Alternatively, the size of the sub PUs and/or the index of the selected candidate may be implicitly determined based on information that may be obtained by the decoding apparatus, such as the PU size, a CU size including the PU, and whether the CU size is a predefined minimum CU size.

For another example, a PU may be partitioned into sub PUs of a $P_i \times Q_i$ size adaptively changed depending on the characteristics of video. In this case, i indicates the index of each sub PU within the PU.

Figure 7:
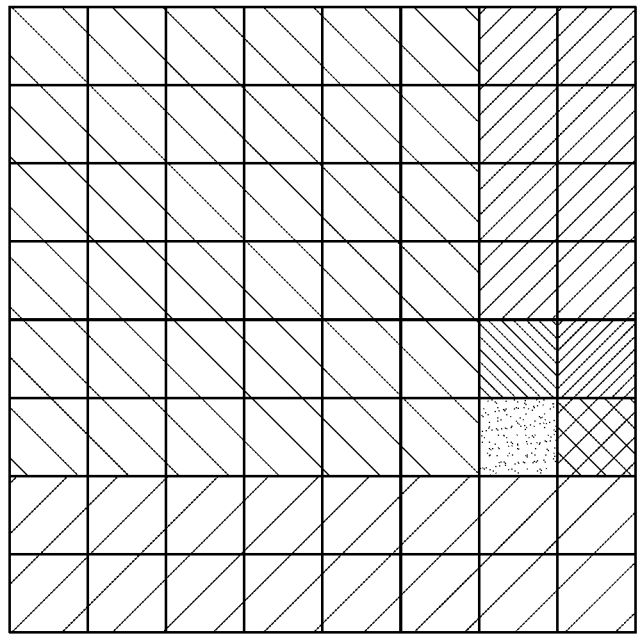
FIG. 7 illustrates a method of deriving a sub PU according to an example of the present invention.

FIG. 7 illustrates a method of deriving a sub PU according to an example of the present invention.

Referring to FIG. 7, a PU may be partitioned into sub PUs of a $P_i \times Q_i$ size adaptively changed depending on the characteristics of video. In this case, each region indicates a sub PU. In the present embodiment, $P_0 \times Q_0 = 6 \times 6$, $P_1 \times Q_1 = 4 \times 2$, $P_3 \times Q_3 = P_4 \times Q_4 = P_5 \times Q_5 = P_6 \times Q_6 = 1 \times 1$, and $P_7 \times Q_7 = 2 \times 8$.

For another example, a PU may be partitioned into sub PUs of a given region depending on the characteristics of video. In this case, the sub PU may include a given region other than a rectangular region.

Figure 8:
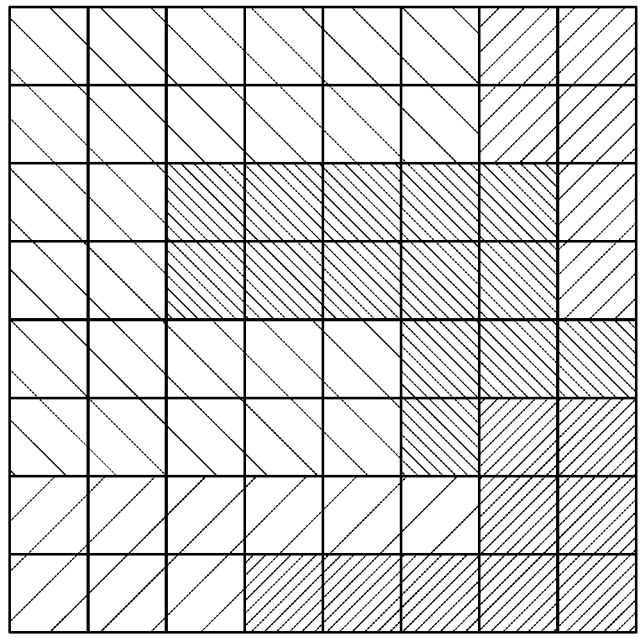
FIG. 8 illustrates a method of deriving a sub PU according to another example of the present invention.

FIG. 8 illustrates a method of deriving a sub PU according to another example of the present invention. As in FIG. 8, a PU may be partitioned into sub PUs of a given region depending on the characteristics of video.

Meanwhile, the super sample may be determined according to the following method.

For example, the first sample of a sub PU, that is, a sample at a top-left sample position may be determined as a super sample.

For another example, an N-th sample of a sub PU may be determined as a super sample. The N is a positive integer. The N may be previously determined or may be determined by the encoding apparatus and signaled with respect to the decoding apparatus.

For yet another example, the center sample or center bottom-right sample of a sub PU may be determined as a super sample. If the sub PU has an even row size and an even column size, four samples neighbor the center of the sub PU. The center bottom-right sample indicates a sample on the bottom right side of the four samples.

For another example, a sample having a value most similar to an average value or median value of the samples of a sub PU may be determined as a super sample. For example, an average value or median value may be calculated based on prediction samples obtained based on the derived two MVs with respect to each of the samples of the sub PU, and a sample at a prediction sample position having a value most similar to the average value or median value may be determined as a super sample.

Meanwhile, in (b) of FIG. 5, the current PU has been illustrated as being partitioned into the n sub PUs, but this is an example. A current PU is not partitioned into a plurality of sub PUs (or n=1), a super sample and non-super sample may be divided from the samples of the current PU, and a refine MV derived through refine prediction for the super sample may be used for the refine prediction of the non-super samples.

Figure 9:
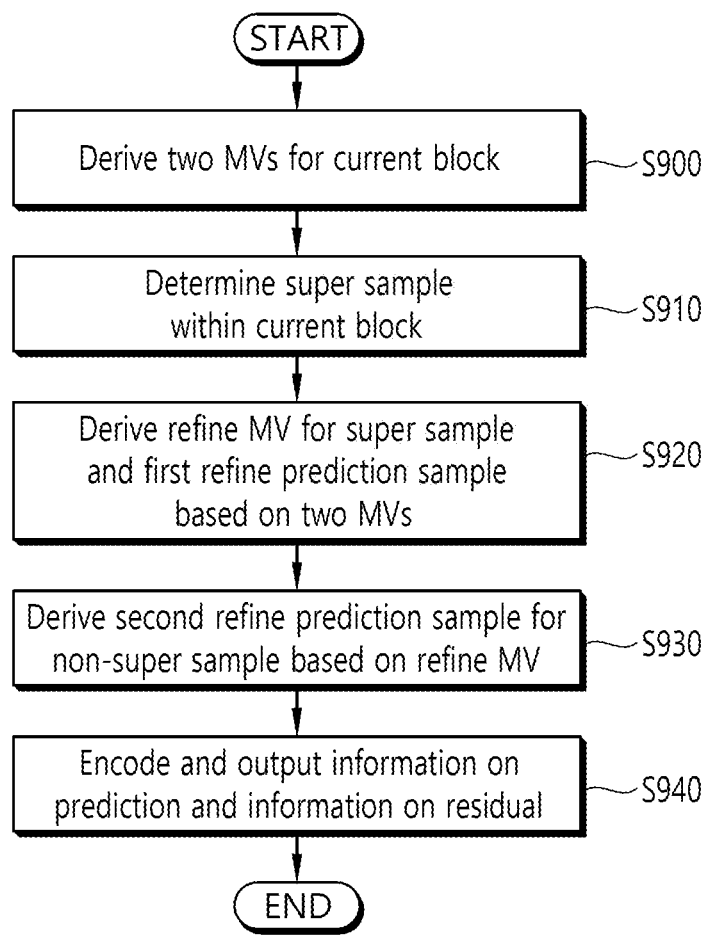
FIG. 9 schematically shows an example of a video encoding method according to the present invention.

FIG. 9 schematically shows an example of a video encoding method according to the present invention. The method disclosed in FIG. 9 may be performed by the encoding apparatus. Specifically, for example, S900 to S930 of FIG. 9 may be performed by the predictor of the encoding apparatus. S940 may be performed by the entropy encoder of the encoding apparatus.

Referring to FIG. 9, the encoding apparatus derives two MVs for a current block (S900). The encoding apparatus may derive the two MVs if the current block is included in a B slice and bi-prediction is applied to the current block. In this case, the encoding apparatus may derive the best MVs through motion estimation. The encoding apparatus may derive a reference picture list 0 (L0) and a reference picture list 1 (L1). The two MVs may be an MVL0 regarding the L0 and an MVL1 regarding the L1.

The current block may be a current prediction unit (PU) or a current sub PU partitioned from a current PU. The current PU is partitioned into n (n is a positive integer) sub PUs of a P×Q size, and the current sub PU may be any one of the sub PUs.

For example, the size of the sub PUs may be previously determined. Alternatively, regarding the size of the sub PUs, one of previously determined sub PU size candidates may be selected, and the index of the selected candidate may be included in the information about prediction and signaled to the decoding apparatus. Alternatively, the size of the sub PUs and/or the index of the selected candidate may be implicitly determined based on information, such as the PU size, a CU size including the PU, and whether the CU size is a predefined minimum CU size.

For another example, the PU may be partitioned into sub PUs of a $P_i \times Q_i$ size adaptively changed depending on the characteristics of video. In this case, i indicates the index of each sub PU. For yet another example, the PU may be partitioned into sub PUs of a given region depending on the characteristics of video. Alternatively, the PU may be implicitly determined based on information, such as the PU size of the sub PUs according to each index, a CU size including the PU, and whether the CU size is a predefined minimum CU size.

The encoding apparatus may indicate the two MVs for the current block using neighbor blocks of the current block (if the current block is a current PU) or neighbor blocks of a current PU including the current block (if the current block is a current sub PU). For example, the encoding apparatus may generate a candidate list based on neighbor blocks or the motion vectors of the neighbor blocks, and may signal to the decoding apparatus for an index indicating a specific candidate of the candidate list through information about prediction.

The encoding apparatus determines a super sample within the current block (S910). For example, the encoding apparatus may determine the first sample of the current block, that is, a sample at the top-left sample position, as the super sample.

For another example, the encoding apparatus may determine an N-th sample of the current block as the super sample. The N may be previously determined or the encoding apparatus may determine the super sample and signal to the decoding apparatus for the super sample. For yet another example, the encoding apparatus may determine the center sample or center bottom-right sample of the current block as the super sample. For yet another example, the encoding apparatus may determine a sample, having a value most similar to an average value or median value of the samples of the current block, as the super sample.

The encoding apparatus derives a refine MV for the super sample and a first refine prediction sample based on the two MVs (S920).

The refine MV for the super sample may be derived based on Equations 6 to 9. For example, when the coordinates of the super sample are [i,j], $v_x[i,j]$ and $v_y[i,j]$ that enable $\Delta^2[i,j]$ of Equation 6 to have a minimum value may be the x component and y component of the refine MV.

The first refine prediction sample for the super sample may be derived based on Equation 10.

The encoding apparatus derives a second refine prediction sample for a non-super sample based on the refine MV (S930). The encoding apparatus may derive the second refine prediction sample for the non-super sample based on Equations 6 to 10. In this case, in performing refine prediction on at least one non-super sample other than the super sample, the encoding apparatus uses a refine MV for the super sample instead of the two MVs for the current block. In this case, the encoding apparatus may further derive a symmetrical refine MV including the original point symmetrical value of the refine MV for the super sample, and may use it for the refine prediction for the non-super sample. For example, in the refine prediction for the non-super sample, $I^{(0)}[i,j]$ of Equation 6 may be an L0 reference sample value derived using the refine MV (or symmetrical refine MV), and $I^{(1)}[i,j]$ may be an L1 reference sample value derived using the symmetrical refine MV (or the refine MV).

The encoding apparatus encodes and outputs information about the prediction and information about a residual (S940). The encoding apparatus may encode the information about prediction and the information about the residual and output them in the form of a bit stream. The bit stream may be transmitted to the decoding apparatus over a network or through a storage medium.

The information about the prediction may further include prediction mode information of the current block. The prediction mode information may indicate an inter-prediction mode applied to the current block. Furthermore, the prediction mode information may indicate whether refine prediction is applied to the current block.

The encoding apparatus may generate residual samples based on the original samples of an original picture and the derived refine prediction samples. The encoding apparatus may generate the information about the residual based on the residual samples. The information about the residual may include transform coefficients for the residual samples.

Figure 10:
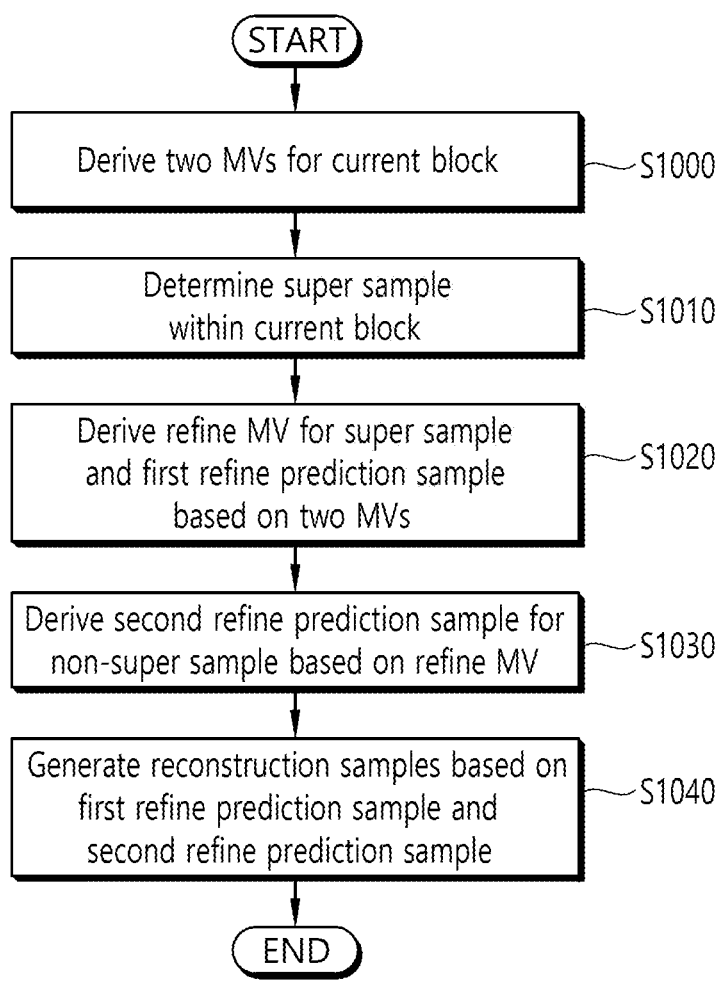
FIG. 10 schematically shows an example of a video decoding method according to the present invention.

FIG. 10 schematically shows an example of a video decoding method according to the present invention. The method disclosed in FIG. 10 may be performed by the decoding apparatus. Specifically, for example, S1000 to S1030 of FIG. 10 may be performed by the predictor of the decoding apparatus, and S1040 may be performed by the adder of the decoding apparatus.

Referring to FIG. 10, the decoding apparatus derives two MVs for a current block (S1000). The decoding apparatus may obtain information about prediction through a bit stream, may derive an inter-prediction mode applied to the current block based on the information about prediction, and may determine whether refine prediction is applied to the current block.

If the current block is included in a B slice and bi-prediction is applied to the current block, the decoding apparatus may derive the two MVs. The decoding apparatus may derive a reference picture list 0 (L0) and a reference picture list 1 (L1), and the two MVs may be an MVL0 regarding the L0 and an MVL1 regarding the L1.

The current block may be a current prediction unit (PU) or a current sub PU partitioned from a current PU. The current PU is partitioned into n (n is a positive integer) sub PUs of a P×Q size, and the current sub PU may be any one of the sub PUs.

For example, the size of the sub PUs may be previously determined. Alternatively, regarding the size of the sub PUs, one of previously determined sub PU size candidates may be selected, and the index of the selected candidate may be included in the information about prediction and signaled to the decoding apparatus. The decoding apparatus may determine the size of the sub PUs based on the index of the selected candidate. For another example, the PU may be partitioned into sub PUs of a $P_i \times Q_i$ size adaptively changed depending on the characteristics of video. In this case, i indicates the index of each sub PU. For yet another example, the PU may be partitioned into sub PUs of a given region depending on the characteristics of video.

The decoding apparatus may derive the two MVs for the current block using neighbor blocks of the current block (if the current block is a current PU) or neighbor blocks of a current PU including the current block (if the current block is a current sub PU). For example, the decoding apparatus may generate a candidate list based on neighbor blocks or the motion vectors of the neighbor blocks, and may select a specific candidate based on an index indicating the specific candidate of the candidate list.

The decoding apparatus determines a super sample within the current block (S1010). For example, the decoding apparatus may determine the first sample of the current block, that is, a sample at the top-left sample position, as the super sample.

For another example, the decoding apparatus may determine an N-th sample of the current block as the super sample. The N may be previously determined, or the N may be determined by the encoding apparatus and information indicating the N may be included in the information about prediction and signaled to the decoding apparatus. For yet another example, the decoding apparatus may determine the center sample or center bottom-right sample of the current block to be a super sample. For yet another example, the decoding apparatus may determine a sample, having a value most similar to an average value or median value of the samples of the current block, as the super sample.

The decoding apparatus derives a refine MV for the super sample and a first refine prediction sample based on the two MVs (S1020).

The refine MV for the super sample may be derived based on Equations 6 to 9. For example, when the coordinates of the super sample are [i,j], $v_x[i,j]$ and $v_y[i,j]$ that enable $\Delta^2[i,j]$ of Equation 6 to have a minimum value may be the x component and y component of the refine MV.

The first refine prediction sample for the super sample may be derived based on Equation 10.

The decoding apparatus derives a second refine prediction sample for a non-super sample based on the refine MV (S1030). The decoding apparatus may derive the second refine prediction sample for the non-super sample based on Equations 6 to 10. In this case, in performing refine prediction on at least one non-super sample other than the super sample, the encoding apparatus may use a refine MV for the super sample instead of the two MVs for the current block. In this case, the coding apparatus may further derive a symmetrical refine MV including the original point symmetrical value of the refine MV for the super sample, and may use it for the refine prediction for the non-super sample. For example, in the refine prediction for the non-super sample, $I^{(0)}[i,j]$ of Equation 6 may be an L0 reference sample value derived using the refine MV (or the symmetrical refine MV), and $I^{(1)}[i,j]$ may be an L1 reference sample value derived using the symmetrical refine MV (or the refine MV).

The decoding apparatus generates reconstruction samples based on the first refine prediction sample and the second refine prediction sample (S1040). The decoding apparatus may directly use the prediction samples as the reconstruction samples depending on a prediction mode or may generate the reconstruction samples by adding residual samples to the prediction samples.

If residual samples for the current block are present, the decoding apparatus may obtain information about a residual for the current block from the bit stream. The information about the residual may include transform coefficients regarding the residual samples. The decoding apparatus may derive the residual samples using the transform coefficients obtained from the bit stream.

The decoding apparatus may derive a reconstruction picture based on the reconstruction samples.

In accordance with the present invention, a more accurate refine motion vector of a current block of a sample unit can be derived, and inter-prediction efficiency can be significantly improved.

Furthermore, in accordance with the present invention, the best prediction samples can be obtained based on the refine motion vector. Accordingly, the amount of data for a residual signal for a current block can be obviated or reduced, and overall coding efficiency can be improved.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The method according to the present invention described above may be implemented in software. The encoding device and/or decoding device according to the present invention may be included in a device that performs image processing, for example, for a TV, a computer, a smart phone, a set-top box, or a display device.

When the embodiments of the present invention are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may comprise an application-specific integrated circuit (ASIC), other chipsets, a logic circuit and/or a data processing device. The memory may include read-only memory (ROM), random access memory (RAM), flash memory, a memory card, a storage medium and/or other storage device.

What is claimed is:

1. A video decoding method performed by a decoding apparatus, the method comprising:
deriving two motion vectors (MVs) for a current block;
determining a super sample among samples within the current block;
deriving a refine motion vector for the super sample and a first refine prediction sample based on the two MVs;
deriving a second refine prediction sample for a non-super sample based on the refine motion vector, wherein the non-super sample is a sample other than the super sample among the samples; and
generating reconstruction samples based on the first refine prediction sample and the second refine prediction sample,
wherein the method further comprises deriving a reference picture list 0 (L0) and a reference picture list 1 (L1),
wherein the two MVs comprise an MVL0 regarding the L0 and an MVL1 regarding the L1, wherein the refine motion vector for the super sample is derived based on an equation below, $$\Delta[i,j]=I^{(0)}[i,j]-I^{(1)}[i,j]+v_x[i,j](I_x^{(0)}[i,j]+I_x^{(1)}[i,j])+v_y[i,j](I_y^{(0)}[i,j]+I_y^{(1)}[i,j]), \text{ and}$$

wherein [i,j] is coordinates of the super sample, the $I^{(0)}[i,j]$ is a value of an L0 reference sample indicated by the MVL0 within a first reference picture within the L0 with respect to the super sample, $I^{(1)}[I,j]$ is a value of an L1 reference sample indicated by the MVL1 within a second reference picture within the L1 with respect to the super sample, $I_x^{(0)}[i,j]$ and $I_y^{(0)}[i,j]$ are x axis and y axis partial differentiation values, respectively, at a [i j] position of the first reference picture, $I_x^{(1)}[i,j]$ and $I_y^{(1)}[i,j]$ indicate x axis and y axis partial differentiation values, respectively, at a [i j] position of the second reference picture, and $v_x[i,j]$ and $v_y[i j]$ are x component and y component of the refine motion vector, respectively, and the $v_x[i,j]$ and $v_y[i j]$ have values enabling $\Delta^2[I,j]$ to have a minimum value.

2. The method of claim 1, wherein:
the first refine prediction sample is derived based on an equation below, and $$P[i,j]=((P^{(0)}[i,j]+P^{(1)}[i,j])+Vx[i,j](I_x^{(0)}[i,j]-I_x^{(1)}[i,j])+Vy[i,j](I_y^{(0)}[i,j]-I_y^{(1)}[i,j]))>>1$$

wherein P[i,j] indicates a value of the first refine prediction sample.

3. The method of claim 1, wherein:
the current block is a current sub PU partitioned from a current prediction unit (PU), and
the two MVs are derived based on a motion vector of one of neighbor blocks of the current PU.

4. The method of claim 3, wherein:
the current PU is partitioned into n (n is a positive integer) sub PUs of a P×Q size, and
the current sub PU is one of the sub PUs.

5. The method of claim 1, wherein the super sample is a sample at a top-left sample position of the current block.

6. The method of claim 1, wherein the super sample is an N-th (N is a positive integer) sample of the current block.

7. The method of claim 1, wherein the super sample is a center bottom-right sample of the current block.

8. A video decoding apparatus, comprising:
a predictor deriving two motion vectors (MVs) for a current block, determining a super sample among samples within the current block, deriving a refine motion vector for the super sample and a first refine prediction sample based on the two MVs, and deriving a second refine prediction sample for a non-super sample based on the refine motion vector; and
an adder generating reconstruction samples based on the first refine prediction sample and the second refine prediction sample,
wherein the predictor derives a reference picture list 0 (L0) and a reference picture list 1 (L1),
wherein the two MVs comprise an MVL0 regarding the L0 and an MVL1 regarding the L1,
wherein the refine motion vector for the super sample is derived based on an equation below, $$\Delta[i,j]=I^{(0)}[i,j]-I^{(1)}[i,j]+v_x[i,j](I_x^{(0)}[i,j]+I_x^{(1)}[i,j])+v_y[i,j](I_y^{(0)}[i,j]+I_y^{(1)}[i,j]), \text{ and}$$

wherein [i,j] is coordinates of the super sample, the $I^{(0)}[i,j]$ is a value of an L0 reference sample indicated by the MVL0 within a first reference picture within the L0 with respect to the super sample, $I^{(1)}m[i,j]$ is a value of an L1 reference sample indicated by the MVL1 within a second reference picture within the L1 with respect to the super sample, $I_x^{(0)}[i,j]$ and $I_y^{(0)}[i,j]$ are x axis and axis partial differentiation values, respectively, at a [i,j] position of the first reference picture, $I_x^{(1)}[i,j]$ and $I_y^{(1)}[i,j]$ indicate x axis and y axis partial differentiation values, respectively, at a [i,j] position of the second reference picture, and $v_x[i,j]$ and $v_y[i,j]$ are x component and y component of the refine motion vector, respectively, and the $v_x[i,j]$ and the $v_y[i,j]$ have values enabling $\Delta^2[i,j]$ to have a minimum value.

9. The decoding apparatus of claim 8, wherein:
the first refine prediction sample is derived based on an equation below, and $$P[i,j]=((P^{(0)}[i,j]+P^{(1)}[i,j])+Vx[i,j](I_x^{(0)}[i,j]-I_x^{(1)}[i,j])+Vy[i,j](I_y^{(0)}[i,j]-I_y^{(1)}[i,j]))>>1$$

wherein P[i,j] indicates a value of the first refine prediction sample.

10. The decoding apparatus of claim 8, wherein:
the current block is a current sub PU partitioned from a current prediction unit (PU), and
the two MVs are derived based on a motion vector of one of neighbor blocks of the current PU.

11. A video encoding method performed by an encoding apparatus, the method comprising: deriving two motion vectors (MVs) for a current block; determining a super sample among samples within the current block; deriving a refine motion vector for the super sample and a first refine prediction sample based on the two MVs; deriving a second refine prediction sample for a non-super sample based on the refine motion vector, wherein the non-super sample is a sample other than the super sample among the samples; and encoding and outputting information about prediction of the current block and information about a residual sample,
wherein the method further comprises deriving a reference picture list 0 (L0) and a reference picture list 1 (L1),
wherein the two MVs comprise an MVL0 regarding the L0 and an MVL1 regarding the L1, wherein the refine motion vector for the super sample is derived based on an equation below, $$\Delta[i,j]=I^{(0)}[i,j]-I^{(1)}[i,j]+v_x[i,j](I_x^{(0)}[i,j]+I_x^{(1)}[i,j])+v_y[i,j](I_y^{(0)}[i,j]+I_y^{(1)}[i,j]), \text{ and}$$

wherein [i,j] is coordinates of the super sample, the $I^{(0)}[i\ j]$ is a value of an L0 reference sample indicated by the MVL0 within a first reference picture within the L0 with respect to the super sample, $I^{(1)}[I,j]$ is a value of an L1 reference sample indicated by the MVL1 within a second reference picture within the L1 with respect to the super sample, $I_x^{(0)}[i,j]$ and $I_y^{(0)}[i,j]$ are x axis and y axis partial differentiation values, respectively, at a [i j] position of the first reference picture, $I_x^{(1)}[i,j]$ and $I_y^{(1)}[i,j]$ indicate x axis and y axis partial differentiation values, respectively, at a [i j] position of the second reference picture, and $v_x[i,j]$ and $v_y[i\ j]$ are x component and y component of the refine motion vector, respectively, and the $v_x[i,j]$ and $v_y[i\ j]$ have values enabling $\Delta^2[i,j]$ to have a minimum value.

* * * * *